(12) United States Patent
Tomihisa et al.

(10) Patent No.: US 6,391,994 B2
(45) Date of Patent: May 21, 2002

(54) PRODUCTION PROCESS FOR VINYLPYRROLIDONE POLYMER

(75) Inventors: Daijo Tomihisa, Moriguchi; Nobuyuki Harada, Suita; Akio Naka, Suita; Toshiaki Kuriyama, Suita; Yuuji Shimasaki, Otsu; Hideyuki Nishibayashi, Kobe, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/772,971

(22) Filed: Jan. 31, 2001

(30) Foreign Application Priority Data

Feb. 10, 2000 (JP) .......................................... 2000-34191

(51) Int. Cl.$^7$ ................................................ C08F 26/08
(52) U.S. Cl. ........................ 526/264; 526/258; 526/263
(58) Field of Search ................................ 526/258, 263, 526/264

(56) References Cited

U.S. PATENT DOCUMENTS

| 5,625,076 A | 4/1997 | Shimasaki et al. .......... 548/552 |
| 5,801,252 A | 9/1998 | Yano et al. .................. 548/554 |

FOREIGN PATENT DOCUMENTS

| JP | 8141402 | 6/1996 |
| JP | 2939433 | 6/1999 |

OTHER PUBLICATIONS

"Non–Classical Free–radical Polymerization: 5. The Purification and Polymerization of 1–vinyl–2–pyrrolidone"; Bamford et al.; Polymer, 1985, vol. 26, June.

Primary Examiner—Helen L. Pezzuto
(74) Attorney, Agent, or Firm—Roylance, Abrams, Berdo & Goodman, L.L.P.

(57) ABSTRACT

The present invention provides a production process for a vinylpyrrolidone polymer which process prevents the polymerization reaction of N-vinylpyrrolidone from being hindered by by-products (as formed by nucleomethylation of N-vinylpyrrolidone) or γ-butyrolactone, and therefore enables to obtain a vinylpyrrolidone polymer that has a desired molecular weight and involves only a small amount of residual monomers, wherein the vinylpyrrolidone polymer can display excellent properties even if the vinylpyrrolidone polymer is, for example, crosslinked to convert it into a water-absorbent resin. The production process for a vinylpyrrolidone polymer comprises the step of polymerizing a polymerizable monomer component or components which include N-vinylpyrrolidone, wherein: the N-vinylpyrrolidone as used is N-vinylpyrrolidone having a γ-butyrolactone content of not more than 500 ppm; and/or the N-vinylpyrrolidone as used is N-vinylpyrrolidone obtained without using acetylene as a raw material.

16 Claims, No Drawings

PRODUCTION PROCESS FOR VINYLPYRROLIDONE POLYMER

BACKGROUND OF THE INVENTION

A. Technical Field

The present invention relates to a production process for a vinylpyrrolidone polymer.

B. Background Art

Vinylpyrrolidone polymers, such as poly (vinylpyrrolidone) and vinylpyrrolidone copolymers, are widely used in various fields such as medicines, cosmetics, pressure sensitive adhesives or adhesives, paints, dispersants, inks, and electronic parts, because the vinylpyrrolidone polymers have merits and advantages of biocompatibility, safety, hydrophilicity, and so on. In addition, crosslinked products of the vinylpyrrolidone polymers are useful as water-absorbent resins for various uses requiring water absorption and/or water retention, for example, disposable diapers.

Up to now, N-vinylpyrrolidone as used for producing the vinylpyrrolidone polymers is, for example, industrially produced by a process comprising the step of carrying out a reaction between 2-pyrrolidone and acetylene (Reppe process) or by a process comprising the step of carrying out a dehydration reaction of N-hydroxyethylpyrrolidone. In addition, both 2-pyrrolidone and N-hydroxyethylpyrrolidone, which are precursors of the N-vinylpyrrolidone in these production processes, are usually derived from γ-butyrolactone, and this γ-butyrolactone is known to be produced by, for example, (1) a process comprising the step of obtaining γ-butyrolactone by way of 1,4-butanediol from acetylene and formaldehyde, (2) a process comprising the step of obtaining γ-butyrolactone by way of 1,4-butanediol from butadiene and acetic acid, or (3) a process comprising the step of carrying out a hydrogenation reaction of maleic anhydride.

However, in many cases where N-vinylpyrrolidone as obtained by these processes is polymerized, the molecular weight of the resultant polymer is hard to raise, or a large amount of monomers remain. Such disadvantages do not only reduce the purity or yield of the resultant vinylpyrrolidone polymer, but also bring about problems of such as use limitation or productivity deterioration. Furthermore, for example, in the case where the resultant polymer is crosslinked to convert it into a water-absorbent resin, the above disadvantages are causes of the deterioration of resin properties such as water absorption capacity and gel strength.

SUMMARY OF THE INVENTION

A. Object of the Invention

An object of the present invention is to provide a production process for a vinylpyrrolidone polymer which process enables to obtain a vinylpyrrolidone polymer that has a desired molecular weight and involves only a small amount of residual monomers, wherein the vinylpyrrolidone polymer can display excellent properties even if the vinylpyrrolidone polymer is, for example, crosslinked to convert it into a water-absorbent resin.

B. Disclosure of the Invention

The present inventors diligently studied to solve the above-mentioned problems. As a result, the inventors directed their attention to a fact that 2-pyrrolidone or N-hydroxyethylpyrrolidone, which is a raw material for synthesizing N-vinylpyrrolidone, is usually derived from γ-butyrolactone, and then they have found that the polymerization of N-vinylpyrrolidone is easily hindered when the γ-butyrolactone content in N-vinylpyrrolidone is more than a certain amount. Furthermore, they have found that in the case where acetylene is used as a raw material when obtaining N-vinylpyrrolidone, for example, in the case where acetylene is used when producing the γ-butyrolactone which is an intermediate raw material for N-vinylpyrrolidone or where N-vinylpyrrolidone is produced by the reaction between 2-pyrrolidone and acetylene, by-products by nucleomethylation of N-vinylpyrrolidone are formed and hinder the polymerization of N-vinylpyrrolidone. The present invention has been completed on the basis of these findings.

That is to say, a production process for a vinylpyrrolidone polymer, according to the present invention, comprises the step of polymerizing a polymerizable monomer component or components which include N-vinylpyrrolidone, wherein:

(1) the N-vinylpyrrolidone as used is N-vinylpyrrolidone having a γ-butyrolactone content of not more than 500 ppm; and/or (2) the N-vinylpyrrolidone as used is N-vinylpyrrolidone obtained without using acetylene as a raw material.

These and other objects and the advantages of the present invention will be more fully apparent from the following detailed disclosure.

DETAILED DESCRIPTION OF THE INVENTION

Hereinafter, a detailed description is given about a mode for carrying out the present invention.

In the present invention, firstly, it is important to use N-vinylpyrrolidone having a γ-butyrolactone content of not more than 500 ppm. When synthesizing N-vinylpyrrolidone, there is a case where γ-butyrolactone remains in the resultant N-vinylpyrrolidone because N-vinylpyrrolidone is usually produced by way of γ-butyrolactone. In the case where the γ-butyrolactone content in N-vinylpyrrolidone exceeds 500 ppm, the polymerization of N-vinylpyrrolidone is hindered. The method for decreasing the γ-butyrolactone content to not more than 500 ppm is not especially limited. However, for example, in the production process for N-vinylpyrrolidone, the γ-butyrolactone content in N-vinylpyrrolidone can be decreased by promoting the conversion of γ-butyrolactone using an excess of ammonia relative to γ-butyrolactone in the case of producing N-vinylpyrrolidone by way of 2-pyrrolidone as a precursor, or using an excess of ethanolamine relative to γ-butyrolactone in the case of producing N-vinylpyrrolidone by way of N-hydroxyethylpyrrolidone as a precursor. In addition, the γ-butyrolactone content in N-vinylpyrrolidone or in 2-pyrrolidone and N-hydroxyethylpyrrolidone, which are precursors, may be decreased by conventional purification methods such as distillation and crystallization.

In the present invention, secondly, it is important to use N-vinylpyrrolidone obtained without using acetylene as a raw material, whereby not only can the formation of by-products by nucleomethylation of N-vinylpyrrolidone, namely, N-vinyl-3-methyl-2-pyrrolidone, N-vinyl-4-methyl-2-pyrrolidone, and N-vinyl-5-methyl-2-pyrrolidone, be inhibited, but also the bad influence that the polymerization of N-vinylpyrrolidone is hindered, which bad influence is caused by the above by-products, can be prevented. In more detail, there is a possibility that acetylene is used in steps, such as (1) and (2) below, in the production process for N-vinylpyrrolidone. However, it is important to avoid using acetylene in both of:

(1) a step of a vinylation reaction of 2-pyrrolidone with acetylene, and (2) a step of synthesizing 1,4-butanediol from formaldehyde and acetylene in order to obtain γ-butyrolactone which is used as a precursor of 2-pyrrolidone or N-hydroxyethylpyrrolidone which is a raw material for synthesizing N-vinylpyrrolidone.

In the present invention, it is the most preferable to use N-vinylpyrrolidone which has a γ-butyrolactone content of not more than 500 ppm and is obtained without using acetylene as a raw material.

There is no especial limitation in the production process for N-vinylpyrrolidone as used in the present invention if this process is the above process without using acetylene. However, the process preferably involves a gas phase dehydration reaction of N-hydroxyethylpyrrolidone. Furthermore, it is preferable that a product derived from maleic anhydride is used as γ-butyrolactone which is a precursor of N-hydroxyethylpyrrolidone. The specific method for carrying out the gas phase dehydration reaction of N-hydroxyethylpyrrolidone is not especially limited and, for example, methods as reported in JP-A-141402/1996 and Japanese Patent No. 2939433 can be adopted.

The purity of the aforementioned N-vinylpyrrolidone, as used in the present invention, is preferably not less than 99.7 weight %. In the case where N-vinylpyrrolidone having a purity of less than 99.7 weight % is polymerized, there are disadvantages in that the polymerization of the N-vinylpyrrolidone might be hindered by influence of impurities other than γ-butyrolactone and the nucleomethylated N-vinylpyrrolidone wherein the impurities have not been identified yet.

The production process according to the present invention comprises the step of polymerizing a polymerizable monomer component or components which include the aforementioned N-vinylpyrrolidone. There is no especial limitation in the polymerizable monomer component or components if they include at least the aforementioned N-vinylpyrrolidone. For example, N-vinylpyrrolidone may be used either alone or in combination with any polymerizable monomer that can be copolymerized with N-vinylpyrrolidone. Incidentally, when the polymerizable monomer other than N-vinylpyrrolidone is copolymerized with N-vinylpyrrolidone, the N-vinylpyrrolidone content in the polymerizable monomer components is not especially limited, but is preferably not less than 50 weight %, more preferably not less than 90 weight %.

The polymerizable monomer that can be copolymerized with N-vinylpyrrolidone is not especially limited. Specific examples thereof include: 1) (meth)acrylate esters such as methyl (meth)acrylate, ethyl (meth)acrylate, butyl (meth)acrylate, cyclohexyl (meth)acrylate, and hydroxyethyl (meth)acrylate; 2) (meth)acrylamide and derivatives therefrom such as N-monomethyl(meth)acrylamide, N-monoethyl(meth)acrylamide, and N,N-dimethyl(meth)acrylamide; 3) basic unsaturated monomers, such as dimethylaminoethyl (meth) acrylate, dimethylaminoethyl(meth)acrylamide, vinylpyridine, and vinylimidazole, and their salts or quaternized products; 4) vinylamides such as vinylformamide, vinylacetamide, and vinyloxazolidone; 5) carboxyl-group-containing unsaturated monomers, such as (meth)acrylic acid, itaconic acid, maleic acid, and fumaric acid, and their salts; 6) unsaturated anhydrides such as maleic anhydride and itaconic anhydride; 7) vinyl esters such as vinyl acetate and vinyl propionate; 8) vinylethylene carbonate and derivatives therefrom; 9) styrene and derivatives therefrom; 10) 2-sulfoethyl (meth)acrylate and derivatives therefrom; 11) vinylsulfonic acid and derivatives therefrom; 12) vinyl ethers such as methyl vinyl ether, ethyl vinyl ether, and butyl vinyl ether; and 13) olefins such as ethylene, propylene, octene, and butadiene. Of these, particularly, groups 1) to 8) are favorable in respect to, for example, the copolymerizability with N-vinylpyrrolidone. As to the above monomers, only one kind or any mixture of two or more kinds may be copolymerized with N-vinylpyrrolidone.

In the present invention, particularly, a crosslinkable monomer having at least two polymerizable double bond groups per molecule is preferably copolymerized with N-vinylpyrrolidone. This crosslinkable monomer may be copolymerized along with the above-mentioned various polymerizable monomers. If a proper amount of the crosslinkable monomer is copolymerized with N-vinylpyrrolidone, any crosslinked structure can be formed to obtain a water-absorbent resin having water insolubility and/or water swellability. The water-absorbent resin is useful as water-absorbing agents for various uses requiring water absorption and/or water retention, for example, disposable diapers.

Specific examples of the above crosslinkable monomer include N,N'-methylenebis(meth)acrylamide, N,N'-methylenebis(N-vinylalkylamides), (poly)ethylene glycol di(meth)acrylate, (poly)propylene glycol di(meth)acrylate, trimethylolpropane tri(meth)acrylate, trimethylolpropane di(meth)acrylate, glycerol tri(meth)acrylate, glycerol acrylate methacrylate, ethylene-oxide-denatured trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, poly (meth)allyloxyalkanes, div inylbenzene, divinyltoluene, divinylxylene, divinylnaphthalene, divinyl ether, divinyl ketone, trivinylbenzene, tolylene diisocyanate, and hexamethylene diisocyanate. These may be used either alone respectively or in combinations with each other.

The amount of the above crosslinkable monomer as used is not especially limited and may fitly be adjusted according to aimed uses. For example, if 0.0001 to 10 parts by weight (preferably 0.01 to 1 part by weight) of the crosslinkable monomer is copolymerized with 100 parts by weight of N-vinylpyrrolidone, a crosslinked polymer which has excellent water absorption capacity and gel strength can be obtained.

The polymerization reaction method in the present invention is not especially limited. For example, the polymerization reaction can be carried out by conventional polymerization methods such as solution polymerization, emulsion polymerization, suspension polymerization and precipitation polymerization.

As to solvents as used in the above-mentioned polymerization reaction, water is preferable. However, a solvent that can dissolve in water can also be used by mixing it with water. Examples of such a solvent include at least one alcohol selected from the group consisting of methyl alcohol, ethyl alcohol, isopropyl alcohol, n-butyl alcohol, and diethylene glycol. Particularly, if a mixed solvent obtained by mixing water with a solvent such as isopropyl alcohol or n-butyl alcohol is used, there are advantages of inhibiting side reactions because the boiling point of water, namely, the polymerization temperature, becomes low due to azeotropic function.

When carrying out the above-mentioned polymerization reaction, reaction conditions such as reaction temperature and pressure are not especially limited. It is, for example, preferable that the reaction temperature is in the range of 20 to 150° C. and that the pressure in the reaction system is normal or reduced pressure.

When carrying out the above-mentioned polymerization reaction, a polymerization initiator can be used. There is no especial limitation in the polymerization initiator if the initiator can generate radicals due to such as heating. However, a water-soluble initiator that uniformly dissolves in water into a concentration of not less than 5 weight % at room temperature is favorable. Specific examples thereof include: peroxides such as hydrogen peroxide and t-butyl hydropeoxide; azo compounds such as 2-(carbamoylazo) isobutyronitrile, 2,2'-azobis(2-amidinopropane) dihydrochloride, 2,2'-azobis(2-methyl-N-phenylpropionamidine) dihydrochloride, 2,2'-azobis[2-(N-allylamidino)propane] dihydrochloride, 2,2'-azobis[2-(5-hydroxy-3,4,5,6-tetrahydropyrimidin-2-yl)propane] dihydrochloride, 2,2'-azobis[2-(2-imidazolin-2-yl)propane] dihydrochloride, and 2,2'-azobis[2-methyl-N-(2-hydroxyethyl)propionamide]; persulfate salts such as potassium persulfate, ammonium persulfate, and sodium persulfate; and redox type initiators which generates radicals by combinations of oxidants and reductants, such as combinations of: ascorbic acid and hydrogen peroxide; sodium sulfoxylate and t-butyl hydroperoxide; and persulfate salts and metal salts. These may be used either alone respectively or in combinations with each other.

The amount of the polymerization initiator as used is not especially limited, but is preferably in the range of 0.002 to 15 weight %, more preferably 0.01 to 5 weight %, of the polymerizable monomer component or components.

When carrying out the aforementioned polymerization reaction, conventional basic pH-adjusting agents can be used to promote the polymerization reaction or to prevent hydrolysis of N-vinylpyrrolidone. The addition of the pH-adjusting agent can be carried out by any method. For example, the pH-adjusting agent may be charged into the system in the initial stage of the polymerization or added into the system successively during the polymerization. Specific examples of the pH-adjusting agent include ammonia, aliphatic amines, aromatic amines, sodium hydroxide, and potassium hydroxide. Of these, ammonia is particularly favorable. These may be used either alone respectively or in combinations with each other. When using the pH-adjusting agent, its amount is not especially limited, but the pH-adjusting agent is preferably used so that the pH of the solution during the polymerization will be in the range of 5 to 10, more preferably 7 to 9.

When carrying out the aforementioned polymerization reaction, conventional transition metal salts can be used in order to, for example, promote the polymerization reaction. Specific examples of the transition metal salt include carboxylic acid salts or chlorides of copper, iron, cobalt and nickel. These may be used either alone respectively or in combinations with each other. When using the transition metal salt, its amount is not especially limited, but is preferably in the range of 0.1 to 20,000 ppb, more preferably 1 to 5,000 ppb, in ratio by weight to the polymerizable monomer component or components.

When carrying out the aforementioned polymerization reaction, such as any chain transfer agent or buffering agent can be used, if necessary, in addition to the aforementioned polymerization initiator and, as the occasion demands, the aforementioned pH-adjusting agent or transition metal salt.

When carrying out the aforementioned polymerization reaction, the method for adding the aforementioned components to be charged is not especially limited, but the addition can be carried out by any method of such a type as batch type or continuous type.

(Effects and Advantages of the Invention):

The production process for a vinylpyrrolidone polymer, according to the present invention, prevents the polymerization reaction of N-vinylpyrrolidone from being hindered by by-products (as formed by nucleomethylation of N-vinylpyrrolidone) or γ-butyrolactone, and therefore enables to obtain a vinylpyrrolidone polymer that has a desired molecular weight and involves only a small amount of residual monomers, wherein the vinylpyrrolidone polymer can display excellent properties even if the vinylpyrrolidone polymer is, for example, crosslinked to convert it into a water-absorbent resin.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited thereto.

N-vinylpyrrolidone and vinylpyrrolidone polymers as obtained in the examples and the comparative examples were analyzed by the following methods:

(K value of vinylpyrrolidone polymer): The vinylpyrrolidone polymer was dissolved in water into a concentration of 1 weight %, and the viscosity of the resultant solution was measured at 25° C. with a capillary viscometer, and K value was calculated from the measured viscosity and the below-mentioned Fikentscher's equation. It can be said that the higher the K value is, the higher the molecular weight is.

$$(\log \eta rel)/C = [(75K_0^2)/(1+1.5K_0C)] + K_0$$

$$K = 1000 K_0$$

wherein: C denotes the grams of the vinylpyrrolidone polymer in 100 ml of solution; and ηrel denotes the viscosity of the solution for the solvent.

(Impurities composition and purity of N-vinylpyrrolidone and amount of unreacted residual N-vinylpyrrolidone): These were measured by liquid chromatography under the following conditions:

Column: "CAPCELL PAC C18UG12" produced by Shiseido Co., Ltd.

Solvent: 20 mmol/L, solution comprising aqueous sodium 1-heptanesulfonate solution/methanol (volume ratio: 95/5)

Temperature: 20° C.

Flow rate: 0.1 ml/min

[Production Example 1 of N-vinylpyrrolidone]

Crude N-vinylpyrrolidone was obtained by carrying out a gas phase dehydration reaction of N-(2-hydroxyethyl)-2-pyrrolidone which had been derived from maleic anhydride as a raw material. This crude N-vinylpyrrolidone was purified by distillation in order that the removal ratio of the initial distillate would be 20 weight % of the original liquid of the distillation and that the yield would be 60 weight % of the original liquid of the distillation, thus obtaining N-vinylpyrrolidone (NVP-A1) having an impurities composition as shown in Table 1.

[Production Example 2 of N-vinylpyrrolidone]

N-vinylpyrrolidone (NVP-A2) having an impurities composition as shown in Table 1 was obtained in the same way as of Production Example 1 except that the crude N-vinylpyrrolidone was purified by distillation in order that the removal ratio of the initial distillate would be 10 weight % of the original liquid of the distillation and that the yield would be 70 weight % of the original liquid of the distillation.

[Comparative Production Example 1 of N-vinylpyrrolidone]

N-vinylpyrrolidone (NVP-B) having an impurities composition as shown in Table 1 was obtained by adding γ-butyrolactone to N-vinylpyrrolidone (NVP-A1) (obtained in Production Example 1) in a ratio of 520 ppm thereto.

[Comparative Production Example 2 of N-vinylpyrrolidone]

N-vinylpyrrolidone (NVP-C) having an impurities composition as shown in Table 1 was obtained in the same way as of Production Example 1 except that the crude N-vinylpyrrolidone was purified by distillation in order that the removal ratio of the initial distillate would be 3 weight % of the original liquid of the distillation and that the yield would be 77 weight % of the original liquid of the distillation.

[Comparative Production Example 3 of N-vinylpyrrolidone]

N-vinylpyrrolidone (NVP-D) having an impurities composition as shown in Table 1 was obtained in the same way as of Production Example 1 except that crude N-vinylpyrrolidone was obtained by carrying out a gas phase dehydration reaction of N-(2-hydroxyethyl)-2-pyrrolidone which had been derived from γ-butyrolactone as a raw material which had been obtained by the acetylene process.

[Comparative Production Example 4 of N-vinylpyrrolidone]

N-vinylpyrrolidone (NVP-E) having an impurities composition as shown in Table 1 was obtained by carrying out a reaction between 2-pyrrolidone and acetylene, wherein 2-pyrrolidone had been derived from γ-butyrolactone as a raw material which had been obtained by the acetylene process.

TABLE 1

|  | Production Example 1 (NVP-A1) | Production Example 2 (NVP-A2) | Comparative Production Example 1 (NVP-B) | Comparative Production Example 2 (NVP-C) | Comparative Production Example 3 (NVP-D) | Comparative Production Example 4 (NVP-E) |
| --- | --- | --- | --- | --- | --- | --- |
| 2-Py (ppm) | 260 | 600 | 260 | 1200 | 300 | 90 |
| GBL (ppm) | 180 | 420 | 700 | 900 | 780 | 170 |
| 3Me-NVP (ppm) | N.D. | N.D. | N.D. | N.D. | 1100 | 1000 |
| 4Me-NVP (ppm) | N.D. | N.D. | N.D. | N.D. | 700 | 600 |
| 5Me-NVP (ppm) | N.D. | N.D. | N.D. | N.D. | 530 | 500 |
| Others (ppm) | 330 | 600 | 330 | 1050 | 810 | 720 |
| Water (ppm) | 300 | 500 | 300 | 520 | 300 | 300 |
| Purity of NVP (wt %) | 99.89 | 99.77 | 99.84 | 99.63 | 99.55 | 99.66 |

2-Py: 2-Pyrrolidone
GBL: γ-Butyrolactone
3Me-NVP: N-vinyl-3-methyl-2-pyrrolidone
4Me-NVP: N-vinyl-4-methyl-2-pyrrolidone
5Me-NVP: N-vinyl-5-methyl-2-pyrrolidone
NVP: N-vinylpyrrolidone
N.D.: Not more than detection limit (non-detectable)

EXAMPLE 1

First, 270 g of water and 0.6 g of 10 ppm aqueous copper acetate solution were charged into a flask (capacity: 500 ml) as equipped with a stirrer, a monomer-supplying tank, a thermometer, a condenser and a nitrogen-gas-introducing tube, and then nitrogen gas was introduced, and the flask was heated under stirred conditions in order to adjust the inner temperature of the flask to 100° C. Next, each of 3 g of 2% aqueous ammonia solution, 21 g of N-vinylpyrrolidone (NVP-A1) (as obtained in Production Example 1), and 1 g of 4% aqueous hydrogen peroxide solution was supplied into the flask 6 times at intervals of 5 minutes to carry out a polymerization. The reaction mixture was stirred for 2 hours at the same temperature as the above to complete the polymerization, thus obtaining an aqueous poly(vinylpyrrolidone) solution. The amount of unreacted residual N-vinylpyrrolidone in the resultant aqueous poly(vinylpyrrolidone) solution was 2 ppm. In addition, the K value of the resultant aqueous poly(vinylpyrrolidone) solution was 30.

EXAMPLE 2

An aqueous poly(vinylpyrrolidone) solution was obtained by carrying out a polymerization in the same way as of Example 1 except to use N-vinylpyrrolidone (NVP-A2) as obtained in Production Example 2. The amount of unreacted residual N-vinylpyrrolidone in the resultant aqueous poly(vinylpyrrolidone) solution was 7 ppm. In addition, the K value of the resultant aqueous poly(vinylpyrrolidone) solution was 29.

COMPARATIVE EXAMPLE 1

An aqueous poly(vinylpyrrolidone) solution was obtained by carrying out polymerization in the same way as of Example 1 except to use N-vinylpyrrolidone (NVP-B) as obtained in Comparative Production Example 1. The amount of unreacted residual N-vinylpyrrolidone in the resultant aqueous poly(vinylpyrrolidone) solution was 18 ppm. In addition, the K value of the resultant aqueous poly(vinylpyrrolidone) solution was 28.

COMPARATIVE EXAMPLE 2

An aqueous poly(vinylpyrrolidone) solution was obtained by carrying out polymerization in the same way as of Example 1 except to use N-vinylpyrrolidone (NVP-C) as obtained in Comparative Production Example 2. The amount of unreacted residual N-vinylpyrrolidone in the resultant aqueous poly(vinylpyrrolidone) solution was 39 ppm. In addition, the K value of the resultant aqueous poly(vinylpyrrolidone) solution was 27.

COMPARATIVE EXAMPLE 3

An aqueous poly(vinylpyrrolidone) solution was obtained by carrying out polymerization in the same way as of Example 1 except to use N-vinylpyrrolidone (NVP-D) as obtained in Comparative Production Example 3. The amount of unreacted residual N-vinylpyrrolidone in the resultant aqueous poly(vinylpyrrolidone) solution was 48 ppm. In addition, the K value of the resultant aqueous poly(vinylpyrrolidone) solution was 25.

COMPARATIVE EXAMPLE 4

An aqueous poly(vinylpyrrolidone) solution was obtained by carrying out polymerization in the same way as of Example 1 except to use N-vinylpyrrolidone (NVP-E) as obtained in Comparative Production Example 4. The amount of unreacted residual N-vinylpyrrolidone in the resultant aqueous poly(vinylpyrrolidone) solution was 52 ppm. In addition, the K value of the resultant aqueous poly(vinylpyrrolidone) solution was 25.

EXAMPLE 3

First, 320 g of water was charged into the same flask as that used in Example 1, and then nitrogen gas was introduced, and the flask was heated under stirred conditions in order to adjust the inner temperature of the flask to 70° C. Next, 80 g of N-vinylpyrrolidone (NVP-A1) (as obtained in Production Example 1) and 0.16 g of 2,2'-azobis(2-amidinopropane) dihydrochloride were supplied into the system over a period of 30 minutes to carry out a polymerization. After the reaction mixture was heated for 2 hours at the same temperature as the above, the inner temperature was raised to 100° C., and then the reaction mixture was heated for another 1 hour to complete the polymerization, thus obtaining an aqueous poly(vinylpyrrolidone) solution. The amount of unreacted residual N-vinylpyrrolidone in the resultant aqueous poly(vinylpyrrolidone) solution was 82 ppm. In addition, the K value of the resultant aqueous poly(vinylpyrrolidone) solution was 91.

COMPARATIVE EXAMPLE 5

An aqueous poly(vinylpyrrolidone) solution was obtained by carrying out polymerization in the same way as of Example 3 except to use N-vinylpyrrolidone (NVP-C) as obtained in Comparative Production Example 2. The amount of unreacted residual N-vinylpyrrolidone in the resultant aqueous poly(vinylpyrrolidone) solution was 390 ppm. In addition, the K value of the resultant aqueous poly(vinylpyrrolidone) solution was 89.

COMPARATIVE EXAMPLE 6

An aqueous poly(vinylpyrrolidone) solution was obtained by carrying out polymerization in the same way as of Example 3 except to use N-vinylpyrrolidone (NVP-E) as obtained in Comparative Production Example 4. The amount of unreacted residual N-vinylpyrrolidone in the resultant aqueous poly(vinylpyrrolidone) solution was 620 ppm. In addition, the K value of the resultant aqueous poly(vinylpyrrolidone) solution was 86.

EXAMPLE 4

An aqueous monomer solution, comprising 30 parts by weight of N-vinylpyrrolidone (NVP-A1) (as obtained in Production Example 1), 0.053 parts by weight of tetraallyloxyethane, and 70 parts by weight of water, was prepared, and oxygen as dissolved therein was forced out by allowing the solution to bubble with nitrogen. The resultant aqueous monomer solution was heated to 50° C. under nitrogen atmosphere, and then 0.027 parts by weight of 2,2'-azobis(2-amidinopropane) dihydrochloride (polymerization initiator) was added, with the result that a polymerization started after 2 hours, and that gelation occurred after 3 hours and 30 minutes. After the gelation, the inner temperature of the system was raised to 80° C., and the reaction had been completed after 5 hours and 30 minutes from the addition of the polymerization initiator. The resultant hydrogel polymer was cut into small pieces, and then dried in a hot-air dryer of 150° C. for 2 hours, and then pulverized. The pulverized product was classified into what passed through a wire gauze of 850 μm, thus obtaining a water-absorbent poly(vinylpyrrolidone) polymer. The resultant polymer could absorb and retain 21.8 g/g of physiological saline (0.9% aqueous sodium chloride solution) relative to the own weight of this polymer.

COMPARATIVE EXAMPLE 7

A polymerization reaction was carried out in the same way as of Example 4 except to use N-vinylpyrrolidone (NVP-E) as obtained in Comparative Production Example 4. The reaction had been completed after 5 hours and 30 minutes from the addition of the polymerization initiator similarly to Example 4. However, the polymerization rate was slower than that in Example 4, and the resultant hydrogel polymer was softer than that obtained in Example 4. This hydrogel polymer was cut, dried, pulverized, and classified in the same way as of Example 4, thus obtaining a comparative polymer. The resultant polymer could absorb and retain only 7.7 g/g of physiological saline (0.9% aqueous sodium chloride solution) relative to the own weight of this polymer.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a vinylpyrrolidone polymer, comprising the step of polymerizing a polymerizable monomer component or components which include N-vinylpyrrolidone, wherein the N-vinylpyrrolidone as used is N-vinylpyrrolidone having a γ-butyrolactone content of not more than 500 ppm.

2. A production process for a vinylpyrrolidone polymer, comprising the step of polymerizing a polymerizable monomer component or components which include N-vinylpyrrolidone, wherein the N-vinylpyrrolidone as used is N-vinylpyrrolidone obtained without using acetylene as a raw material.

3. A production process for a vinylpyrrolidone polymer according to claim 1, wherein the N-vinylpyrrolidone is N-vinylpyrrolidone obtained by carrying out a gas phase dehydration reaction of N-hydroxyethylpyrrolidone.

4. A production process for a vinylpyrrolidone polymer according to claim 2, wherein the N-vinylpyrrolidone is N-vinylpyrrolidone obtained by carrying out a gas phase dehydration reaction of N-hydroxyethylpyrrolidone.

5. A production process for a vinylpyrrolidone polymer according to claim 1, wherein the N-vinylpyrrolidone has a purity of not less than 99.7 weight %.

6. A production process for a vinylpyrrolidone polymer according to claim 2, wherein the N-vinylpyrrolidone has a purity of not less than 99.7 weight %.

7. A production process for a vinylpyrrolidone polymer according to claim 3, wherein the N-vinylpyrrolidone has a purity of not less than 99.7 weight %.

8. A production process for a vinylpyrrolidone polymer according to claim 4, wherein the N-vinylpyrrolidone has a purity of not less than 99.7 weight %.

9. A production process for a vinylpyrrolidone polymer according to claim 1, wherein the polymerizable monomer component or components further include a crosslinkable monomer, and wherein a water-insoluble and/or water-swellable vinylpyrrolidone polymer is obtained.

10. A production process for a vinylpyrrolidone polymer according to claim 2, wherein the polymerizable monomer component or components further include a crosslinkable monomer, and wherein a water-insoluble and/or water-swellable vinylpyrrolidone polymer is obtained.

11. A production process for a vinylpyrrolidone polymer according to claim 3, wherein the polymerizable monomer component or components further include a crosslinkable monomer, and wherein a water-insoluble and/or water-swellable vinylpyrrolidone polymer is obtained.

12. A production process for a vinylpyrrolidone polymer according to claim 4, wherein the polymerizable monomer component or components further include a crosslinkable monomer, and wherein a water-insoluble and/or water-swellable vinylpyrrolidone polymer is obtained.

13. A production process for a vinylpyrrolidone polymer according to claim 5, wherein the polymerizable monomer component or components further include a crosslinkable monomer, and wherein a water-insoluble and/or water-swellable vinylpyrrolidone polymer is obtained.

14. A production process for a vinylpyrrolidone polymer according to claim 6, wherein the polymerizable monomer component or components further include a crosslinkable monomer, and wherein a water-insoluble and/or water-swellable vinylpyrrolidone polymer is obtained.

15. A production process for a vinylpyrrolidone polymer according to claim 7, wherein the polymerizable monomer component or components further include a crosslinkable monomer, and wherein a water-insoluble and/or water-swellable vinylpyrrolidone polymer is obtained.

16. A production process for a vinylpyrrolidone polymer according to claim 8, wherein the polymerizable monomer component or components further include a crosslinkable monomer, and wherein a water-insoluble and/or water-swellable vinylpyrrolidone polymer is obtained.

\* \* \* \* \*